UNITED STATES PATENT OFFICE.

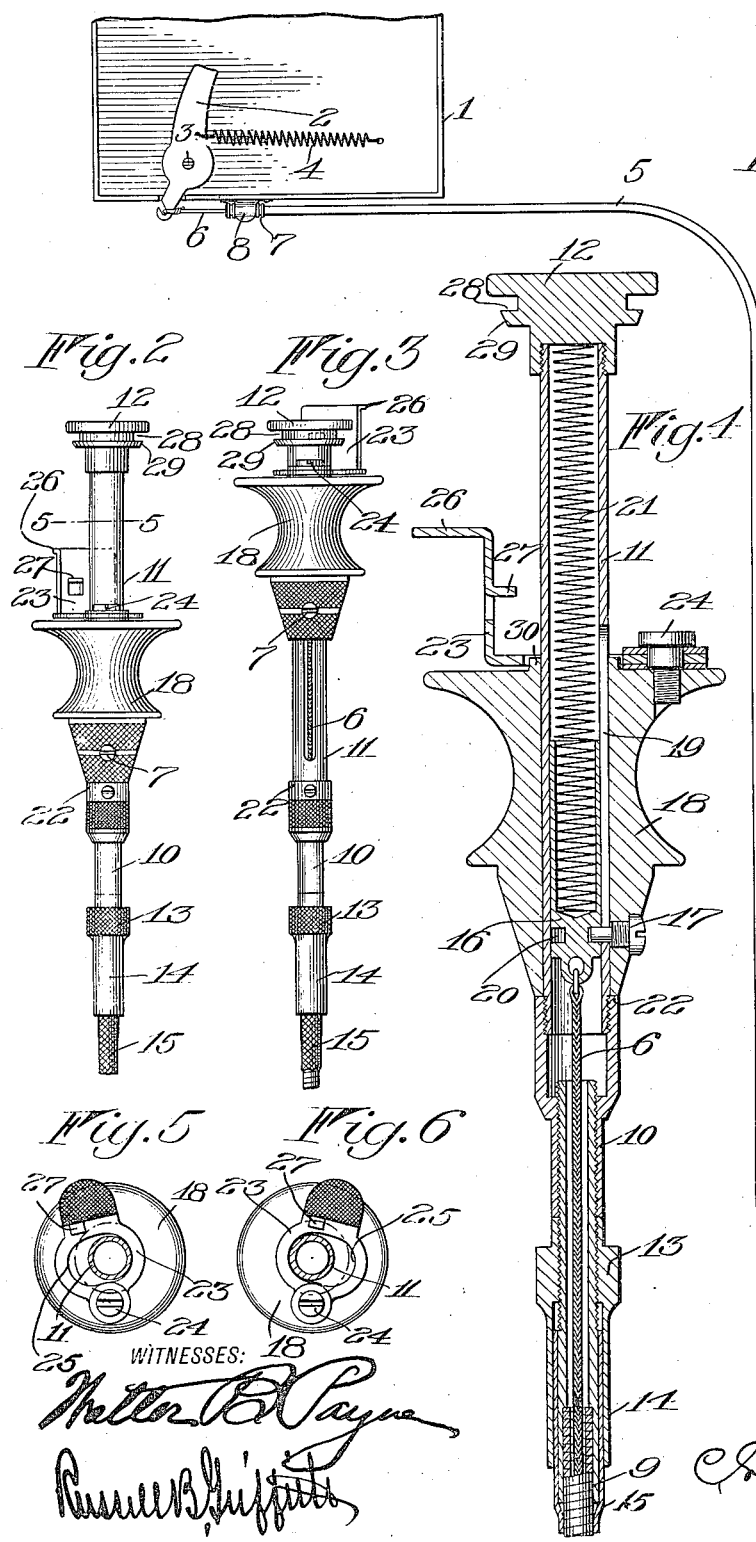

PAUL J. MARKS, OF ROCHESTER, NEW YORK, ASSIGNOR TO EASTMAN KODAK COMPANY, OF ROCHESTER, NEW YORK, A CORPORATION OF NEW YORK.

SHUTTER-OPERATING DEVICE.

1,214,700.

Specification of Letters Patent.

Patented Feb. 6, 1917.

Application filed July 27, 1916. Serial No. 111,622.

*To all whom it may concern:*

Be it known that I, PAUL J. MARKS, of Rochester, in the county of Monroe and State of New York, have invented certain new and useful Improvements in Shutter-Operating Devices; and I do hereby declare the following to be a full, clear, and exact description of the same, reference being had to the accompanying drawings, forming a part of this specification, and to the reference-numerals marked thereon.

My present invention relates to photography and more particularly to photographic shutters and to the devices for operating the latter at a distance which comprise flexible outer and inner tubes connected, respectively, to a stationary part and a trip or movable part of the shutter to take the place of a bulb actuator.

The invention has for its object to improve certain features of construction in devices of this kind for the purpose of obtaining relative adjustment of the inner member and its tube and for retaining the two members in such position when desired that the shutter will be locked open.

To these and other ends the invention resides in certain improvements and combinations of parts all as will be hereinafter more fully described, the novel features being pointed out in the claims at the end of the specification.

In the drawings: Figure 1 is a general view of a shutter actuator constructed in accordance with and illustrating one embodiment of my invention; Fig. 2 is an enlarged elevation of the finger portions of the device in the positions occupied when the shutter is closed; Fig. 3 is a similar view showing the positions of the parts when the shutter is open; Fig. 4 is a further enlarged section through the portion of the device shown in Fig. 2; Fig. 5 is a section taken substantially on the line 5—5 of Fig. 2 with the inner finger piece unlocked, and Fig. 6 is a similar view with the inner finger piece locked.

Similar reference numerals throughout the several views indicate the same parts.

The present embodiment of the invention is designed more particularly for the requirements of professional photography and studio work and I have shown in Fig. 1 a portion of a studio shutter to which the releasing device is operatively attached and in that figure, 1 indicates the stationary part or shutter casing while 2 may represent any shutter lever pivoted at 3 through the actuation of which the shutter is operated and which is normally held in the position shown by a spring 4 to hold the shutter closed.

The operating device consists of an incompressible but laterally flexible outer member or tube 5 in which is contained and moved longitudinally an inextensible but laterally flexible inner member 6 that may be in the form of a woven chain, as indicated in Fig. 4. One end of the outer member 5 is provided with a metal tip 7 which may be removably attached by a clip 8 to the shutter casing 1 in a position in which it is prevented from moving longitudinally in either direction, while at the other end the tube is connected to a threaded sleeve 9. Over this sleeve is threaded a coupling sleeve 10 which is also in turn threaded in a permanent position on a tubular finger-piece 11 terminating in a button or head 12. The coupling sleeve 10 may be adjusted up and down on the terminal sleeve 9 of the tube for purposes that will hereinafter appear and it is held locked in its adjusted position by a nut 13 also threaded on the tube 9. An extension or skirt 14 on this lock nut 15 projects over and surrounds the end of a braided cloth covering 15 for the tube 5 which is cemented to or otherwise secured upon the sleeve 9, the skirt thus covering and protecting the joint though it is free to slip over the surface of the said covering 15.

The end of the inner member or flexible chain 6 that is adjacent to the attached end of the tube 5 is connected to the shutter lever 2, as shown in Fig. 1, so that a pull on the chain will open the shutter against the tension of the spring 4. The other end of the chain 6 as shown in Fig. 4 is connected to a tubular slide block 16 within the finger-piece 11, and this slide block is moved up and down within the said finger-piece through the medium of a screw or pin 17 in a finger-piece 18 that surrounds the finger-piece 11 and is slidable upon its exterior. The pin 17 extends through a slot 19 in the inner finger-piece tube 11 and engages between shoulders formed by an annular recess 20 in the block 16. Normally, the outer finger-piece 18 is held at the lowered position of Figs. 1, 2 and 4 with reference to the inner finger-piece 11 by the influence of a compression spring 21 within the latter, one end of which bears against the abutment 12 while the other is seated within the tubular portion of the block 16.

In the operation of the device as thus far described, to open the shutter the outer finger-piece 18 is straddled by the first and second fingers and pressure is applied by the thumb upon the button 12 of the inner finger-piece 11, the said pressure of the thumb being a reflex pressure by which the fingers draw the outer finger-piece 18 up to the position of Fig. 3. The inner slide block 16 is drawn with it which exerts a pull on the inner member or chain 6 that rocks the lever 2 of the shutter. The reflex of this pull is borne by the push of the thumb against the button 12 through the incompressible tube 5 to the shutter casing 1 at 8 so that the strains upon the shutter structure as a whole are balanced and there is no tendency to move or even jar the shutter or the photographic apparatus to which it is attached. Upon releasing the finger-pieces they resume the relative positions of Figs. 1, 2 and 4 under the influence of the spring 21 and the inner member or chain 6 is withdrawn from the tube 5 by the spring 4 of the shutter lever 2 as the latter moves to closed position. It will be noted that the shoulder provided at 22 by the upper end of the coupling sleeve 10 acts as a stop for limiting the return movement of the outer finger-piece 18 as clearly shown in Fig. 4.

From the foregoing, it will be at once recognized that the adjustable connection between the inner finger-piece 11 and the terminal sleeve 9 of the tube 5 afforded by the provision of the sleeve 10 permits changes in the normal relative positions of the inner and outer members 5 and 6 so that the extent, for instance, to which the inner member or chain 6 may be withdrawn from the tube 5 for attachment to the shutter lever 2 in the latter's normal position may be varied without affecting the full stroke of the finger-piece 18 upon the finger-piece 11. In other words, the travel of the finger-piece 18 on the finger-piece 11 is always the same and the throw of the lever 2 also remains constant whether the inner member 6 makes its attachment to the lever 2 at a near or remote point from the mouth of the tube 5 within certain limits.

For the longer time exposures, not automatically timed, as in a studio shutter, it is sometimes desirable and convenient for the operator to have the finger-pieces retain their actuated positions as in Fig. 3, without the necessity of sustaining the pressure of the fingers upon them. For this purpose, I provide a simple means for locking the finger-pieces in the position of Fig. 3 against the tension of the returning spring 21 and this means comprises, in the present instance, a pivoted latch 23 that turns on a pivot screw 24 secured in the top face of the outer finger-piece 18 on one side of the inner finger-piece 11. This latch lever embraces the inner finger-piece 11 for which purpose it is provided with a laterally elongated inner opening 25 and on the opposite side of the inner finger-piece 11 the latch lever extends vertically and then laterally of the moving parts to provide a thumb grip 26. The lever is of resilient material and the vertical portion is provided with an inwardly extending engaging spur or member 27 while the button 12 of the inner finger-piece 11 is provided with a locking shoulder 28 formed by an annular groove in the button, said shoulder being provided with an inclined or cam surface 29 on its under side.

When the latch lever 23 is in the position of Fig. 5, the engaging portion 27 thereof is out of the path of the shoulder 28 but when the lever is moved laterally to the position of Fig. 6 it is in the path of said shoulder. Therefore, by setting the lever 23 in the position of Fig. 6 and pressing the two finger-pieces together for the full stroke, the engaging portion 27 of the latch will be deflected by the cam 29 and snapped into engagement with the shoulder 28 locking the finger-pieces in the positions of Fig. 3 and holding the shutter open for any desired length of time. When it is desired to close the shutter or to allow it to close, a simple movement of the operator's thumb on the thumb-piece 26 to move the latch lever 23 to the position of Fig. 5, releases the portion 27 from the shoulder 28 and allows the finger-pieces to separate again under the influence of the spring 21. Preferably, the outer finger-piece 18 is provided with a central raised boss 30, as shown in Fig. 4 to act as a guide working in the slot 25 for the lever 23 and prevent the latter from engaging and interfering with the free movement of the inner finger-piece 11 relatively to the finger-piece 18.

I claim as my invention:

1. In a shutter operating device, the combination with inner and outer flexible members, one of which is inextensible and the other incompressible, of a finger-piece for each member, said finger-pieces being slidable upon each other and one of them carrying a stop engaged by the other to determine their normal relationship, a spring for actuating the finger-pieces, relatively, to the said position of normal relationship and an adjustable connection between one of the members and its finger-piece for varying the normal relationship of the members.

2. In a shutter operating device, the combination with inner and outer flexible members, one of which is inextensible and the other incompressible, of a finger-piece for each member, said finger-pieces being slidable upon each other, and an adjustable connection between one of the members and its finger-piece for varying the normal relationship of the members, comprising a threaded coupling sleeve on one part and a threaded portion on the other coöperating therewith.

3. In a shutter operating device, the combination with inner and outer flexible members, one of which is inextensible and the other incompressible, of a finger-piece for each member, said finger-pieces being slidable upon each other, and an adjustable connection between one of the members and its finger-piece for varying the normal relationship of the members, comprising a threaded coupling sleeve on one part and a threaded portion on the other coöperating therewith, said coupling sleeve also serving as a stop to limit the relative movement of the finger-pieces.

4. In a shutter operating device, the combination with a flexible incompressible tube, an inextensible flexible member operating therein and finger-pieces for the tube and member, respectively, slidable one within the other, of a sleeve at one end of the tube, a covering for the latter attached to the sleeve, a threaded coupling connecting the inner finger-piece and the sleeve and threaded upon the latter for relative adjustment of the normal positions of the inner member, and a nut threaded on the sleeve to abut and lock the coupling and having a skirt overlapping the end of the covering on the tube.

5. In a shutter operating device, the combination with inner and outer flexible members, one of which is inextensible and the other incompressible, of a finger-piece for each member slidable one within the other, the outer one being of greater diameter and the inner one being provided with a locking shoulder, and a catch mounted on the outer finger-piece and having an engaging portion movable laterally into coöperation with the said locking shoulder on the inner finger-piece.

PAUL J. MARKS.

Witnesses:
M. JOSEPH SULLIVAN,
EDITH WATERSTRAAT.